A. R. MURRAY.
SHAPING MACHINE.
APPLICATION FILED JUNE 9, 1906.
910,840.
Patented Jan. 26, 1909.
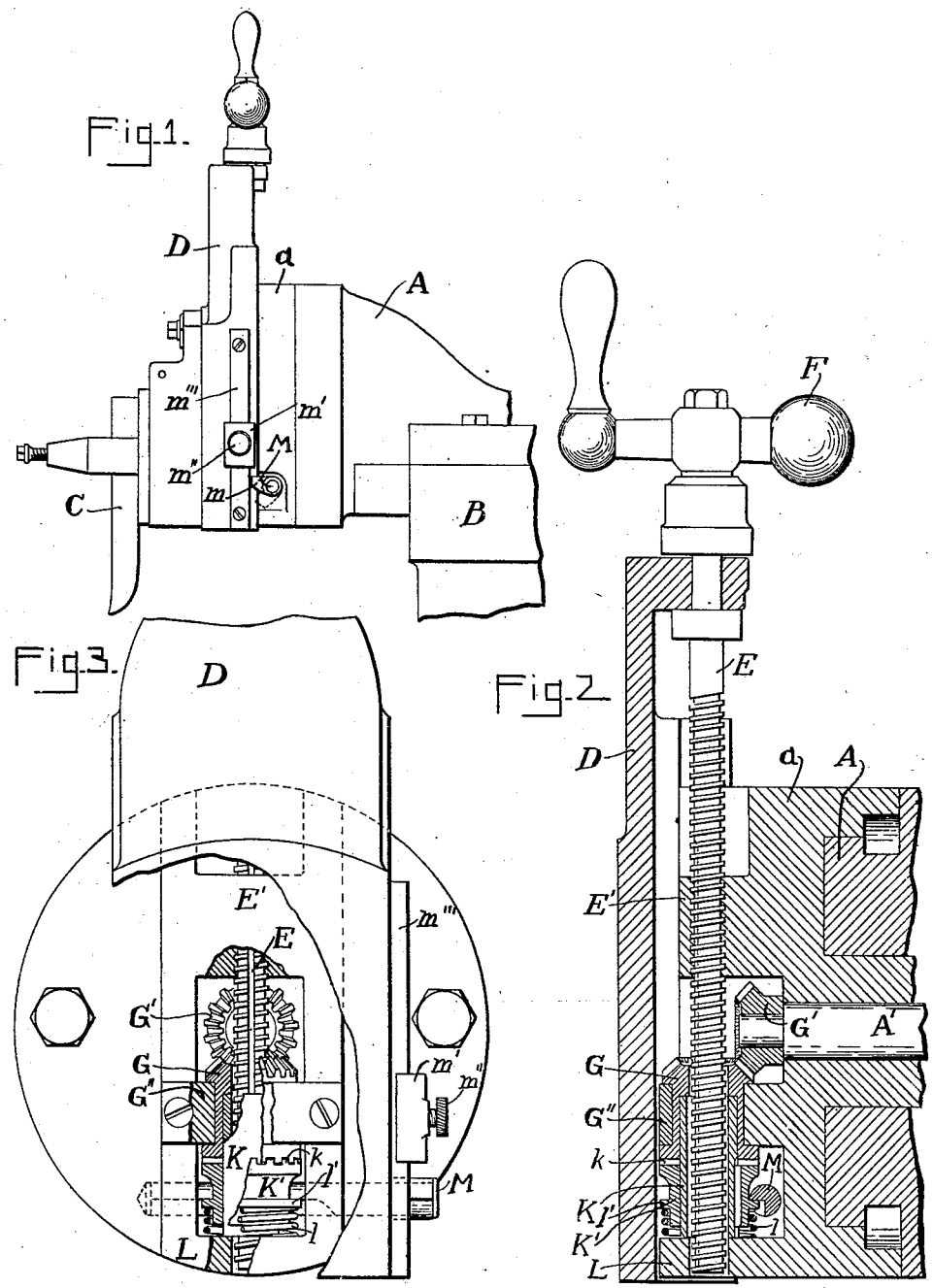
Witnesses.
Homer Bradford.
Joseph T. Richner.
Inventor.
Aristides Reynolds Murray
by Stem Heideman & Mehllope
his Attorneys

UNITED STATES PATENT OFFICE.

ARISTIDES REYNOLDS MURRAY, OF CINCINNATI, OHIO, ASSIGNOR TO THE CINCINNATI SHAPER COMPANY, OF CINCINNATI, OHIO, A CORPORATION OF OHIO.

SHAPING-MACHINE.

No. 910,840.  Specification of Letters Patent.  Patented Jan. 26, 1909.

Application filed June 9, 1906. Serial No. 321,055.

*To all whom it may concern:*

Be it known that I, ARISTIDES REYNOLDS MURRAY, a citizen of the United States, and a resident of Cincinnati, in the county of Hamilton and State of Ohio, have invented a certain new and useful Improvement in Shaping-Machines, of which the following is a full, clear, and exact description, reference being had to the accompanying drawings, which form a part of my specification.

My invention relates to an automatic stop to be used in a shaping machine. Its object is to provide a simple and economical stop to automatically limit and determine the extent of the feed of the tool in any direction, which shall be definite and positive in action. By its use the absence of the workman from the machine during its operation at the critical moment when the feed of the tool should stop will do no harm, as the tool itself will be caused to stop during effective work automatically at the desired point.

I have shown my automatic stop in connection with the vertical feed of the tool of a shaping machine, but from the nature of its arrangement it is apparent that it is equally adaptable for use when the tool is feeding in a direction at an angle to the vertical.

In the drawings:—Figure 1 is a side elevation of the end of the ram of a shaper, showing the external parts of my automatic stop in side elevation; Fig. 2 is a vertical section through the same on an enlarged scale; and Fig. 3 is a front elevation of the ram with parts broken away and the interior shown partly in section.

A is the ram, B the column, C the tool, and D the tool-head. The tool-head D is arranged to slide vertically on the face of the swivel $a$, which is journaled on the end of the ram A in the usual manner. The movement of the tool-head is controlled by a vertical screw E that may be operated by a handle F, or automatically by the reciprocation of the ram as will now be described. The projecting shoulder E' is formed in the swivel $a$ and is threaded to receive the screw E.

A' is a shaft adapted to be rotated intermittently by any convenient mechanism which is brought into action by the reciprocation of the ram:—for example such an arrangement as that shown in Letters Patent No. 656,795, granted August 28th, 1900, to James C. Steen and Charles L. Warner. The swivel $a$ is journaled about an axis coincident with the axis of the shaft A'. Mounted loosely on the screw E is a sleeved bevel-gear G, said gear meshing with a gear G' on the end of the shaft A'. The sleeve of the gear G is provided with a flange at the bottom, and is supported in position by means of a strap G'' secured to the face of the swivel $a$. A sleeve K is feathered to the screw E and turns loosely within the sleeve of the gear G. A clutch K' surrounds the sleeve K and is feathered thereto, and is provided at its upper end with teeth $k$ which engage teeth in the flange of the sleeve of gear G. A coiled spring $l$ bears between a collar $l'$ on the clutch K', and a projecting lug L through which the screw E passes. This spring tends normally to hold the said teeth in engagement. A short shaft M is journaled in the swivel head $a$, and extends transversely to the direction of travel of the ram, and projects at one side through the face thereof where it is provided with a pawl $m$ adapted to be struck by a lug $m'$ adjustably secured by a set screw $m''$ to a bar $m'''$ on the side face of the tool-head.

The operation of the device is as follows:— As in the operation of the machine the shaft A' is rotated, said rotation is communicated to the beveled gear G and to its sleeve, and through the teeth $k$ to the clutch K' and thence to the sleeve K, which being keyed to the screw E rotates the same and thus causes the feed of the tool-head. When the tool-head travels down far enough to bring the lug $m'$ into engagement with the pawl $m$, the shaft M is rotated, and by reason of the notched engagement of its inner end with the collar $l'$ on the clutch K' said sleeve is depressed so as to disengage the teeth $k$. The further rotation of the shaft A' will then result in the rotation of the beveled gear G loosely on the screw, and the feed of the tool F will cease.

It is apparent that by the arrangement above described, the action of the automatic stop will be the same, whether the feed of the tool is in a vertical line or in a line at an angle to the vertical. It is also apparent that my automatic stop is applicable to a shaping machine which has no swivel head, but which has a vertical feed only.

Having thus described my invention, what I desire to claim as new and cover by Letters Patent, is:—

1. In a machine of the class described, in combination with the tool head, the feed screw, and the ram, an intermittently operated shaft and gear, a second gear turning loosely on the screw in mesh with the first gear, said second gear having a hub provided with teeth, a clutch feathered on said screw and normally held in engagement with the teeth on the hub of said second gear, a stop adjustably secured to the tool head, a pawl carried by the ram located in the path of said stop, and mechanism intermediate said pawl and said clutch adapted to withdraw said clutch from its engagement with the hub of said second gear when said stop strikes said pawl.

2. In a machine of the class described, in combination with the tool head, the feed screw, and the ram, an intermittently operated shaft and gear, a second gear turning loosely on the screw in mesh with the first gear, said second gear having a hub provided with teeth, a spring controlled clutch feathered on said screw normally held in engagement with the teeth on the hub of said second gear, a shaft located adjacent said clutch having a shoulder, rotatable therewith, in engagement with said clutch, a pawl on said shaft, and a stop adjustably secured to said tool head adapted to strike said pawl at a predetermined point in the path of the tool head.

3. In a machine of the class described, in combination with the tool head, the feed screw and the ram, an intermittently operated shaft and gear journaled in the ram, a second gear turning loosely on the screw in mesh with the first gear, a sleeve feathered to the screw, a spring controlled clutch feathered to the said sleeve, said clutch being normally held in engagement, so as to turn, with said second gear, a stop adjustably secured to the head, a pawl carried by the ram located in the path of said stop, and a shaft on which said pawl is keyed located adjacent said clutch and having a shoulder adapted to engage and withdraw said clutch from its engagement with said second gear upon the rotation of said shaft.

4. In a machine of the class described, in combination with the tool head, the feed screw, the swivel and the ram, an intermittently operated shaft and gear journaled in the ram with its axis coincident with the axis of rotation of the swivel, a second gear turning loosely on the screw in mesh with the first gear, a sleeve feathered to the screw, a spring controlled clutch feathered to said sleeve normally engaging, so as to turn, with the hub of said second gear, an adjustable stop on the head, a shaft located adjacent said clutch and having a shoulder rotatable therewith in engagement with said clutch, and a pawl secured to the said shaft in the path of said stop.

5. In a machine of the class described, in combination with the too head, the feed screw, the swivel and the ram, an intermittently operated shaft and gear journaled in the ram with its axis coincident with the axis of rotation of the swivel, a second gear provided with a hub having teeth turning loosely on the screw in mesh with the first gear, a sleeve feathered to the screw, a spring controlled clutch feathered to said sleeve engaging the teeth on the hub of said second gear, a shaft journaled in the swivel, said shaft having a shoulder, rotatable therewith, adapted to engage said clutch, a pawl on the outer end of said shaft, and an adjustable stop secured to the head adapted to engage said pawl.

6. In a machine of the class described, in combination with the tool head, the feed screw, the swivel and the ram, an intermittently operated shaft and gear journaled in the ram with its axis coincident with the axis of rotation of the swivel, a sleeve feathered to the screw and fixed in location in the direction of its length, a clutch feathered to said sleeve and adapted to move on said sleeve, a gear loosely journaled on said sleeve in mesh with said first mentioned gear and provided with teeth above said clutch, a spring holding said clutch in engagement with said teeth, a shaft journaled in said swivel, said shaft having a shoulder, rotatable therewith, adapted to engage said clutch, a pawl located at the end of the shaft, and an adjustable stop on said tool head adapted to strike said pawl.

ARISTIDES REYNOLDS MURRAY.

Witnesses:
 FREDERIC W. MACKAY,
 CHAS. G. JOHANNESMEYER.